(12) United States Patent
Freund et al.

(10) Patent No.: US 8,627,662 B2
(45) Date of Patent: Jan. 14, 2014

(54) EXHAUST GAS RECIRCULATION HEAT RECOVERY SYSTEM AND METHOD

(75) Inventors: Sebastian Walter Freund, Unterföhring (DE); Jassin Marcel Fritz, Munich (DE)

(73) Assignee: General Electric Company, Niskayuna, NY (US)

( * ) Notice: Subject to any disclaimer, the term of this patent is extended or adjusted under 35 U.S.C. 154(b) by 81 days.

(21) Appl. No.: 13/276,492

(22) Filed: Oct. 19, 2011

(65) Prior Publication Data
US 2013/0098030 A1 Apr. 25, 2013

(51) Int. Cl.
*F02B 33/44* (2006.01)

(52) U.S. Cl.
USPC .......................................... 60/606; 60/605.2

(58) Field of Classification Search
USPC ................................. 60/606, 605.2
See application file for complete search history.

(56) References Cited

U.S. PATENT DOCUMENTS

| | | | |
|---|---|---|---|
| 3,775,971 A * | 12/1973 | Gadefelt | 60/606 |
| 4,426,848 A * | 1/1984 | Stachowicz | 60/605.2 |
| 5,740,786 A | 4/1998 | Gartner | |
| 6,038,860 A * | 3/2000 | Bailey | 60/605.2 |
| 6,342,846 B1 * | 1/2002 | Argentieri | 340/977 |
| 6,826,903 B2 | 12/2004 | Yahata et al. | |
| 6,988,365 B2 | 1/2006 | Sasaki | |
| 7,958,873 B2 * | 6/2011 | Ernst et al. | 123/568.12 |
| 2007/0227472 A1 | 10/2007 | Takeuchi et al. | |
| 2009/0173071 A1 | 7/2009 | Kapich | |
| 2009/0223220 A1 * | 9/2009 | Vuk | 60/605.2 |
| 2010/0050631 A1 | 3/2010 | Yager | |
| 2010/0050634 A1 | 3/2010 | Yager | |
| 2011/0088671 A1 | 4/2011 | Johnson | |
| 2011/0094486 A1 * | 4/2011 | Vuk | 60/605.2 |

OTHER PUBLICATIONS

Butts, "Development of an Exhaust Energy Recovery System Model", Cummins, Inc.; Gamma Technologies North American User's Conference; Downloaded on Oct. 19, 2011 from the Internet :<http://www.gtisoft.com/confarch/Cummins-ExhaustEnergy.pdf>; 17 Pages.

* cited by examiner

*Primary Examiner* — Thomas Denion
*Assistant Examiner* — Ngoc T Nguyen
(74) *Attorney, Agent, or Firm* — Joseph J. Christian

(57) ABSTRACT

A system for recovering heat from recirculating exhaust gases is provided. The system includes a first exhaust manifold in fluid communication with multiple combustion chambers of an engine. The system also includes a turbocharger having a turbine stage and a compressor stage, wherein the turbine stage comprises an inlet port in fluid communication with the first exhaust manifold and the compressor stage includes an inlet port for air intake and an outlet port for compressed air. The system includes an exhaust gas recirculation cooler having a first flow path and a second flow path, wherein the first flow path is configured to receive a portion of exhaust gas from the first exhaust manifold flowing through an exhaust gas recirculation loop. The second flow path includes an inlet for receiving a compressed air for drawing heat from the exhaust gas flowing through the first flow path.

19 Claims, 4 Drawing Sheets

EXHAUST GAS RECIRCULATION HEAT RECOVERY SYSTEM AND METHOD

BACKGROUND

The invention relates generally to an exhaust gas recirculation system and more particularly to a system and method for waste heat recovery from the recirculating exhaust gases.

Generally, the exhaust gas recirculation (EGR) is a nitrogen oxide (NOx) emissions reduction technique in internal combustion engines such as diesel engines or petrol/gasoline engines. NOx forms primarily when a mixture of nitrogen and oxygen is subjected to high temperature within a combustion chamber of the engines. High amounts of nitrogen oxides (NOx) emissions in atmosphere causes air pollution leading to formation of smog and adversely affecting the environment. In an EGR system, a portion of the exhaust gas is recirculated through piping from an exhaust manifold to an inlet manifold of the engine. This involves cooling the exhaust gas, mixing with an intake air and finally recirculating back into the engine through the inlet manifold. The cooling of the exhaust gas is important to ensure low emissions and maintain good efficiency of the engine. Further, the cooling of the exhaust gas is predominantly done using an EGR cooler, which EGR cooler is a heat exchanger. Generally, the EGR cooler uses water or ambient air to draw heat from the flow of hot exhaust gas. This leads to wastage of energy and without reduction in fuel consumption.

Accordingly, there is an ongoing need for recovering the heat form the recirculating exhaust gases to derive useful work.

BRIEF DESCRIPTION

In accordance with an embodiment of the invention, a system for recovering heat from recirculating exhaust gases is provided. The system includes a first exhaust manifold in fluid communication with multiple combustion chambers of an engine. The system also includes a turbocharger having a turbine stage and a compressor stage, wherein the turbine stage comprises an inlet port in fluid communication with the first exhaust manifold and the compressor stage includes an inlet port for air intake and an outlet port for compressed air. The system includes an exhaust gas recirculation cooler having a first flow path and a second flow path, wherein the first flow path is configured to receive a portion of exhaust gas from the first exhaust manifold flowing through an exhaust gas recirculation loop. The second flow path includes an inlet for receiving a compressed air for drawing heat from the exhaust gas flowing through the first flow path. Further, the system may include a fluid communication between an outlet of the second flow path of the exhaust gas recirculation cooler and the inlet port of the turbine stage and a charge air cooler in fluid communication with an outlet of the compressor stage for cooling the compressed air and further providing the cooled compressed air to an intake manifold of the engine and the exhaust gas recirculation cooler.

In accordance with an embodiment of the invention, a system for recovering heat from recirculating exhaust gases is provided. The system includes a first exhaust manifold in fluid communication with a first set of combustion chambers of an engine. The system also includes a second exhaust manifold in fluid communication with a second set of combustion chambers of the engine. The system further includes a turbocharger comprising at least one turbine stage and at least one compression stage, wherein the at least one turbine stage comprises an inlet port in fluid communication with the first exhaust manifold. The system includes an exhaust gas recirculation cooler having a first flow path and a second flow path, wherein the first flow path is configured to receive exhaust gas from the second exhaust manifold flowing through an exhaust gas recirculation loop and the second flow path comprising an inlet for receiving a compressed air for drawing heat from the exhaust gas flowing through the first flow path. Further, the system includes a power turbine having an inlet port in fluid communication with an outlet of the second flow path for expanding the heated compressed air. Furthermore, the system includes a combustor disposed in the fluid communication between the power turbine and the outlet of the second flow path for providing additional heat to the heated compressed air and a charge air cooler in fluid communication with an outlet of the compressor stage for cooling the compressed air and further providing the cooled compressed air to an intake manifold of the engine and the exhaust gas recirculation cooler.

In accordance with an embodiment of the invention, a method is provided. The method includes expanding a first flow of exhaust gas from a first set of combustion chambers of an engine in a turbine stage of a turbocharger and compressing a flow of air in a compressor stage of the turbocharger. The method includes cooling the compressed flow of air using a charge air cooler. The method also includes directing a first portion of the cooled compressed air to an exhaust gas recirculation cooler and a second portion of the cooled compressed air to an intake manifold of the engine. The method further includes cooling a flow of exhaust gas from a second set of combustion chambers of the engine in the exhaust gas recirculation cooler by drawing heat into the flow of cooled compressed air. The method also includes directing the flow of exhaust gas from the second set of combustion chambers back to the engine via the intake manifold in an exhaust gas recirculation passage loop and flowing the heated compressed air into a power turbine for expansion.

In accordance with an embodiment of the invention, a method for recovering heat from recirculating exhaust gases is provided. The method includes expanding a first flow of exhaust gas from a set of combustion chambers of an engine in a turbine stage of a turbocharger. The method also includes generating power from a generator connected to a shaft of the turbocharger. The method further includes compressing a flow of air in a compressor stage of the turbocharger. The method includes cooling the compressed flow of air using a charge air cooler. The method also includes directing a first portion of the compressed flow of air to an exhaust gas recirculation cooler and a second portion of the compressed flow of air to an intake manifold of the engine. Further, the method includes cooling a second flow of exhaust gas from the set of combustion chambers of the engine in the exhaust gas recirculation cooler by drawing heat into the compressed flow of air. Furthermore, the method includes directing the second flow of exhaust gas from the set of combustion chambers back to the engine via the intake manifold in an exhaust gas recirculation passage loop. Finally, the method includes directing the compressed flow of air from exhaust gas recirculation cooler into the turbine stage of the turbocharger.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
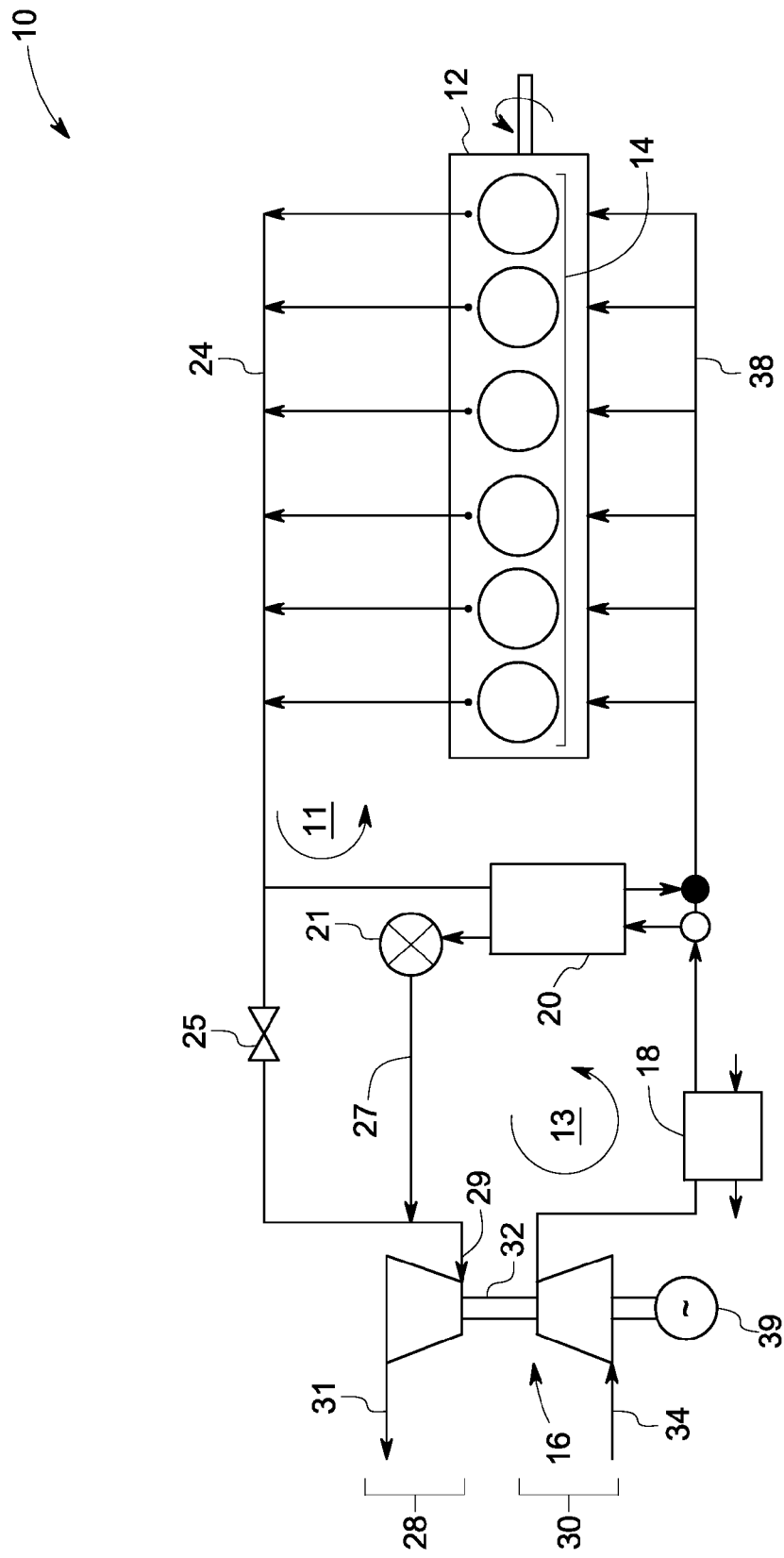
FIG. 1 is system for recovering waste heat from recirculating exhaust gases in accordance with an embodiment of the present invention.

FIG. 1 illustrates a schematic diagram of a system 10 in accordance with an embodiment of the present invention. In one embodiment as shown, the system 10 includes a flow path for exhaust gases in an exhaust gas recirculation (EGR) passage loop 11 and an open loop cycle 13 for recovering heat from the exhaust gases flowing through the exhaust gas recirculation (EGR) passage loop 11. The system 10 includes an engine 12 having multiple combustion chambers 14, a turbocharger 16, and a charge air cooler 18. In one embodiment, the turbocharger 16 comprises a two stage turbocharger having two turbines and two compressors. In one embodiment, the engine 12 is a reciprocating engine. In a non-limiting example, the reciprocating engine may be a diesel engine of a locomotive or a ship. In another embodiment, the engine 12 is a diesel or gas engine based on a two-stroke or a four-stroke engine cycle. In one embodiment, the EGR passage loop 11 further includes an exhaust gas recirculation (EGR) cooler 20 and an intake manifold 38. The open loop cycle 13 includes the EGR cooler 20 and a fluid communication 27 directing the hot compressed air from the EGR cooler 20 to the turbocharger 16. In one embodiment, the system 10 include an optional combustor 21 disposed in the fluid communication 27 between the EGR cooler 20 and an inlet port 29 of the turbocharger 16.

Further, in one embodiment, the system 10 includes an exhaust manifold 24 in fluid communication with the multiple combustion chambers 14 of an engine 12 and the turbocharger 16 and a backpressure valve 25 for EGR rate control. The turbocharger 16 further includes a turbine stage 28 and a compressor stage 30. The turbine stage 28 includes the inlet port 29 in fluid communication with the exhaust manifold 24. The exhaust gases expand in the turbine stage 28 of the turbocharger 16 and subsequently flow out to the atmosphere through an outlet 31 of the turbine stage 28. A shaft 32 from the turbine stage 28 drives a compressor of the compressor stage 30 for compressing an intake of fresh air 34 from an inlet at 36. The compressed fresh air flowing out of the compressor stage 30 is routed through the charge air cooler 18 for cooling before being led into the intake manifold 38 that is in fluid communication with the combustion chambers 14 of the engine 12. In one embodiment, the charge air cooler 18 is a heat exchanger and utilizes a stream of cold air or water for drawing heat from the compressed fresh air, thereby cooling the compressed fresh air.

A portion of the cooled compressed fresh air is routed through the open loop cycle 13 into the EGR cooler 20. The EGR cooler 20 includes a first flow path for receiving the portion of exhaust gas from the exhaust manifold 24 flowing through the exhaust gas recirculation passage loop 11. In one embodiment, the system 10 includes a separate exhaust manifold in fluid communication with one or more combustion chambers of the engine 12 for providing exhaust gases directly to the EGR cooler 20. The EGR cooler 20 also includes a second flow path comprising an inlet for receiving the cooled compressed fresh air. Both opposing gas streams flowing in the first flow path and the second flow path are adjusted such that a desired EGR rate is achieved and the recirculated exhaust gas is cooled sufficiently with the cooled compressed fresh air flowing in the second flow path of the EGR cooler 20. It is to be understood that multiple control valves may be conveniently located in the various flow paths of the present invention to control the flows for optimal performance of the system 10. In one embodiment, the system 10 includes multiple flow control valves arranged in multiple locations for controlling flow of the exhaust gases in the EGR passage loop 11, fuel flow rate to the combustor 21 or flow rate of the compressed fresh air at the outlet of the compressor stage 30. In one embodiment, the system 10 includes a control unit that is configured to control the multiple flow control valves.

In the second flow path of the EGR cooler 20, the cooled compressed fresh air absorbs heat from the exhaust gases flowing through the first flow path in the EGR cooler 20 to form a hot fluid, thereby, the temperature of the hot fluid becomes almost equal to the temperature of the exhaust gas that is routed from the exhaust manifold 24 to the turbocharger 16. On the other hand, the temperature of the exhaust gas flowing through the first flow path is cooled to a temperature that is nearly equal to the temperature of the cooled compressed air flowing from the charge air cooler 18 into the inlet manifold 38. The hot fluid flowing out of the EGR cooler 20 may be further heated by the combustor 21 before being led into the inlet 29. Further, the system 10 also includes a generator 39 coupled to the compressor stage 30 or the turbine stage 31 by a shaft of the turbocharger 16 for generating power and controlling flow rate in the open loop cycle 13.

In one embodiment, the system 10 includes an additional EGR cooler separate from the EGR cooler 20 in the EGR passage loop 11. The compressed fresh air flowing out of the compressor stage 30 is routed directly through the additional EGR cooler for further cooling of the exhaust gas in the EGR passage loop 11. The heated compressed air is then further directed in the open cycle loop 13. In one embodiment, a portion of the compressed fresh air flowing out of the compressor stage 30 is routed through the additional EGR cooler for further cooling of the exhaust gas in the EGR passage loop 11.

Figure 2:
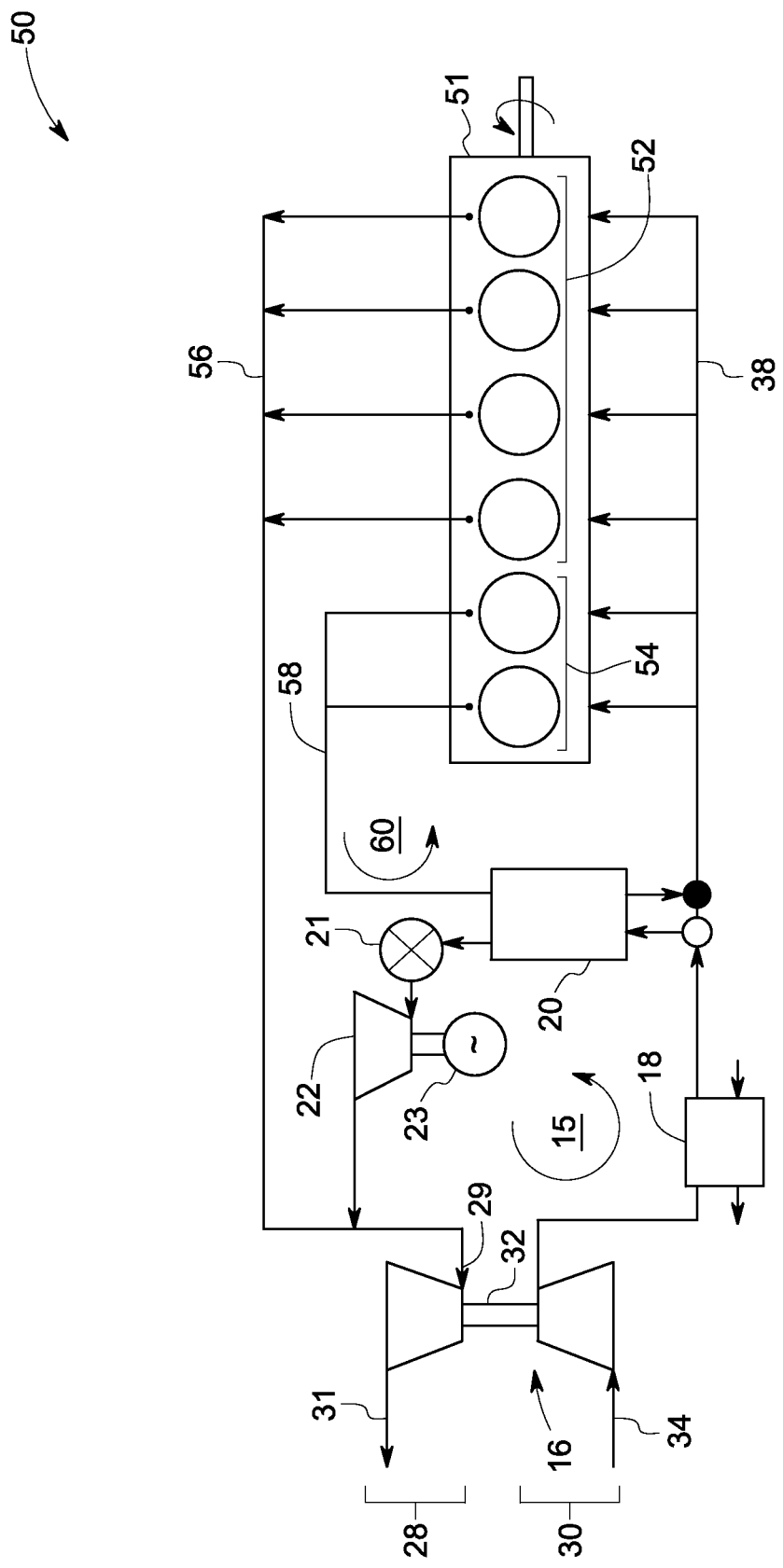
FIG. 2 is system for recovering waste heat from recirculating exhaust gases in accordance with another embodiment of the present invention.

FIG. 2 illustrates a schematic diagram of a system 50 in accordance with another embodiment of the system 10 of FIG. 1. As shown in this embodiment, the system 50 includes an engine 51 having a first set of combustion chambers 52 and a second set of combustion chambers 54. The system includes a first exhaust manifold 56 that is in fluid communication with the first set of combustion chambers 52 and a second exhaust manifold 58 is in fluid communication with the second set of combustion chambers 54. The exhaust gases from first set of combustion chambers 52 are routed to the turbocharger 16 directly via the first exhaust manifold 56. The system 50 also includes an EGR passage loop 60 that recirculates the exhaust gases from the second set of combustion chambers 54 via the second exhaust manifold 58 into the EGR cooler 20 and back into the engine 51 through inlet manifold 38; in this embodiment no backpressure throttle valve is needed for EGR control and a positive pressure differential between the EGR loop and engine intake is always maintained, while the engine exhaust pressure is typically lower than the engine intake pressure.

In one embodiment, an open cycle loop 15 further includes the exhaust gas recirculation (EGR) cooler 20, and a combustor 21 and a power turbine 22 for recovering heat and deriving useful work to generate electricity or drive a load 23 if the pressure differential between engine intake and engine exhaust is sufficient.

The hot fluid flowing out of the EGR cooler 20 may be further heated by the combustor 21 before being led into the power turbine 22. Furthermore, the hot fluid entering a single axial stage or a radial stage of the power turbine 22 and is then expanded to a pressure equal to exhaust gas pressure entering the turbocharger 16 at the inlet 29. In one embodiment, the combustor 21 is an auxiliary combustor. The combustor 21 provides heat to raise the temperature of the hot fluid such that the expanded hot fluid after exiting the power turbine 22 is still hotter than the exhaust gases into which the expanded hot fluid is mixed prior to the entering at the inlet 29 of the turbocharger 16. This heat input ensures that enthalpy difference is available at the turbine stage 28 of the turbocharger 16 without any increase in backpressure and thereby maintaining high efficiency required for driving the compressor of the compressor stage 30.

In one embodiment, the power turbine 22 drives an electric generator. The speed of the electrical generator is controlled to optimize the flow rate of fluid in the power turbine 22. In another embodiment, the power turbine 22 drives a mechanical load, wherein the mechanical load may be a crank shaft of the engine 51. The system 50 ensures reduction in specific fuel consumptions firstly due to increase in mechanical or electrical power from the power turbine 22 and secondly due to a reduction in engine exhaust backpressure from the turbocharger 16 when the turbocharger turbine inlet temperature is raised by mixing exhaust gas with hot compressed air and combustion products from the combustor 21. The other features of the system 50 remain the same as discussed for the system 10 in FIG. 1.

In one embodiment, the system 50 includes an additional EGR cooler separate from the EGR cooler 20 in the EGR passage loop 60. The compressed fresh air flowing out of the compressor stage 30 is routed directly through the additional EGR cooler for further cooling of the exhaust gas in the EGR passage loop 60. The heated compressed air is then further directed in the open cycle loop 15. In one embodiment, a portion of the compressed fresh air flowing out of the compressor stage 30 is routed through the additional EGR cooler for further cooling of the exhaust gas in the EGR passage loop 11.

Figure 3:
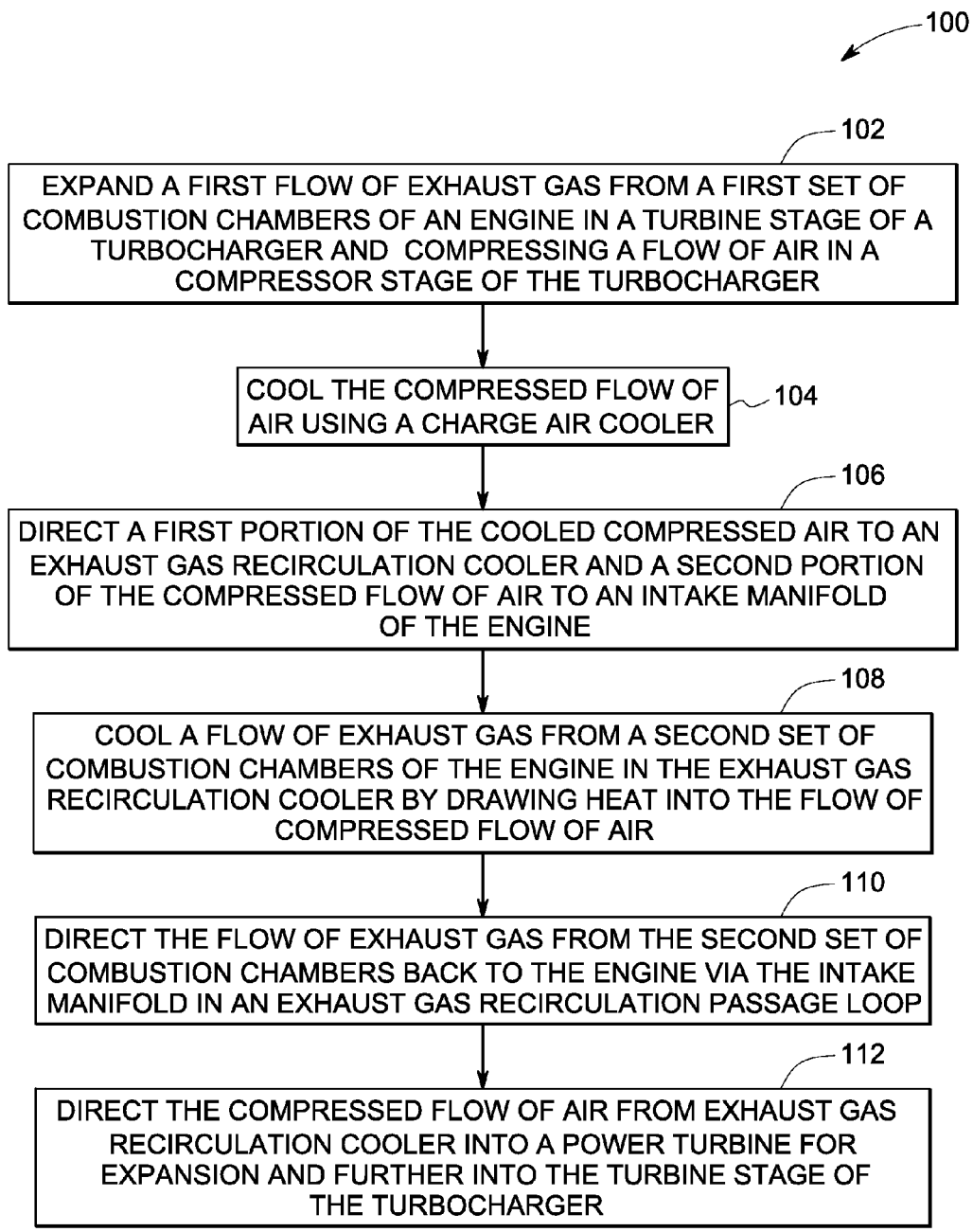
FIG. 3 is a flow chart for a method for recovering waste heat from recirculating exhaust gases in accordance with an embodiment of the present invention.

FIG. 3 is a flow chart of a method 100 in accordance with an embodiment of the present invention. The method 100 provides for a waste heat recovery from a portion of exhaust gases from an engine that is recirculated back into the engine for reduced emissions of NOx. The waste heat recovered in used to drive a power turbine which in turn generates electricity or drives a mechanical load. At step 102, the method includes expanding a first flow of exhaust gas from a first set of combustion chambers of an engine in a turbine stage of a turbocharger and compressing a flow of air in a compressor stage of the turbocharger. The method also includes cooling the compressed flow of air using a charge air cooler at step 104. Further, at step 106, the method includes directing a first portion of the compressed flow of air to an exhaust gas recirculation cooler and a second portion of the compressed flow of air to an intake manifold of the engine. The method 100 also includes cooling a flow of exhaust gas from a second set of combustion chambers of the engine in the exhaust gas recirculation cooler by drawing heat into the compressed flow of air at step 108. Furthermore, the method 100 includes directing the flow of exhaust gas from the second set of combustion chambers back to the engine via the intake manifold in an exhaust gas recirculation passage loop at step 110. Finally, at step 112, the method 100 includes directing the compressed flow of air from exhaust gas recirculation cooler into a power turbine for expansion and further into the turbine stage of the turbocharger.

In one embodiment, the method 100 includes heating the compressed flow of air flowing out of the exhaust gas recirculation cooler by an auxiliary combustor for providing additional heat required for ensuring the compressed flow of air attains a temperature equal to or greater than the exhaust gas after expansion in the turbine stage. This heat input ensures that enthalpy difference is available at the turbine stage of the turbocharger without any increase in backpressure and thereby maintaining high efficiency required for driving the compressor of the compressor stage. In another embodiment, the method 100 includes directing a first portion of the flow of exhaust gases from all the combustion chambers directly into the turbocharger and directing a second portion of the flow of exhaust gases from all the combustion chambers in the exhaust gas recirculation passage loop. The method also includes controlling the flows in the various flow paths using a control unit that controls multiple flow control valves arranged in multiple location of the system 10 of FIG. 1.

Figure 4:
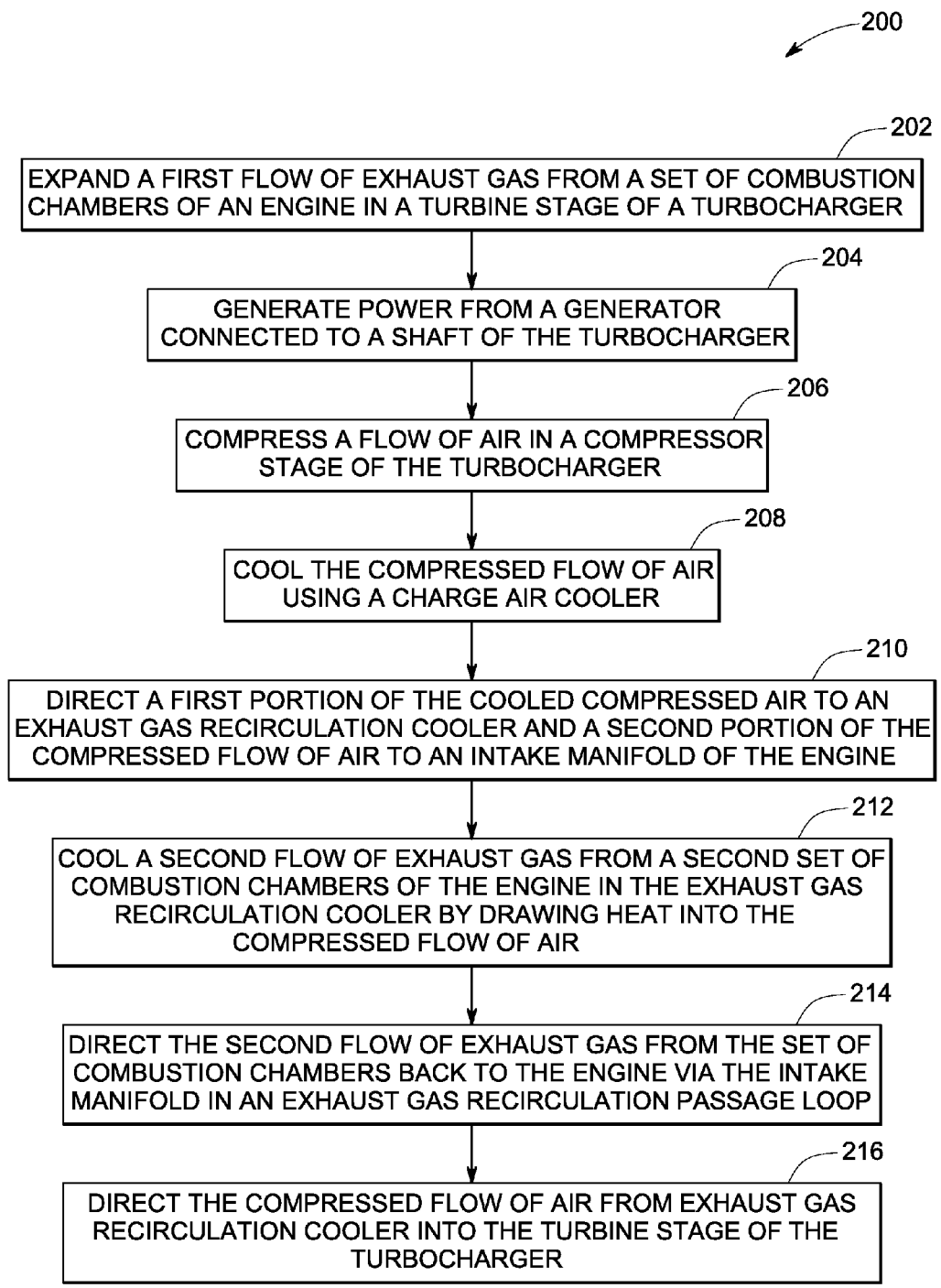
FIG. 4 is a flow chart of a method for recovering waste heat from recirculating exhaust gases in accordance with another embodiment of the present invention.

FIG. 4 is a flow chart of a method 200 in accordance with an embodiment of the present invention. At step 202, the method includes expanding a first flow of exhaust gas from a set of combustion chambers of an engine in a turbine stage of a turbocharger. The method also includes generating power from a generator connected to a shaft of the turbocharger at step 204. The method further includes compressing a flow of air in a compressor stage of the turbocharger at step 206. At step 208, the method includes cooling the compressed flow of air using a charge air cooler. The method includes directing a first portion of the compressed flow of air to an exhaust gas recirculation cooler and a second portion of the compressed flow of air to an intake manifold of the engine at step 210. Further, at step 212, the method includes cooling a second flow of exhaust gas from the set of combustion chambers of the engine in the exhaust gas recirculation cooler by drawing heat into the compressed flow of air. Furthermore, at step 214, the method includes directing the second flow of exhaust gas from the set of combustion chambers back to the engine via the intake manifold in an exhaust gas recirculation passage loop. Finally, the method includes directing the compressed flow of air from exhaust gas recirculation cooler into the turbine stage of the turbocharger at step 216. In one embodiment, the method includes heating the compressed flow of air from the exhaust gas recirculation cooler using a combustor before directing into the turbine stage of the turbocharger.

Advantageously, the present system and method provides for waste heat recovery from the recirculating exhaust gases and driving a power turbine to generate electricity or drive a mechanical load alternatively. Also, the present assembly and method enables reduced brake specific fuel consumption. The performance of the present invention in terms of engine brake specific fuel consumption reduction has an entitlement in excess of two percent. Further advantages include reduction in cooling load on a radiator that is used to dissipate heat from the engines. Furthermore, the present invention allows for a certain flexibility as the temperature of the hot air leaving the power turbine can be adjusted for providing additional power to the turbocharger. Also, the electrical generator may also be used as a motor for pumping cooling air in operation modes when the pressure differential is insufficient. This can substantially improve partload performance of a donor cylinder engine by increasing turbocharger power.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. Of course, it is to be understood that not necessarily all such objects or advantages described above may be achieved in accordance with any particular embodiment. Thus, for example, those skilled in the art will recognize that the assemblies and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
    expanding a first flow of exhaust gas from a first set of combustion chambers of an engine in a turbine stage of a turbocharger and compressing a flow of air in a compressor stage of the turbocharger;
    cooling the compressed flow of air using a charge air cooler;
    directing a first portion of the compressed flow of air to an exhaust gas recirculation cooler and a second portion of the compressed flow of air to an intake manifold of the engine;
    cooling a flow of exhaust gas from a second set of combustion chambers of the engine in the exhaust gas recirculation cooler by drawing heat into the compressed flow of air;
    directing the flow of exhaust gas from the second set of combustion chambers back to the engine via the intake manifold in an exhaust gas recirculation passage loop;
    heating the compressed flow of air flowing out of the exhaust gas recirculation cooler by an auxiliary combustor for providing additional heat required for ensuring the compressed flow of air attains a temperature equal to or greater than the exhaust gas after expansion in the turbine stage; and
    directing the heated compressed flow of air from exhaust gas recirculation cooler into a power turbine for expansion and further into the turbine stage of the turbocharger.

2. The method of claim 1, further comprising generating power via an electric generator or driving a mechanical load.

3. The method of claim 1, wherein the method includes directing the first flow of exhaust gas from the first set of combustion chambers of the engine in the turbine stage via a first exhaust manifold.

4. The method of claim 1, further comprising directing a first portion of the flow of exhaust gases from all the combustion chambers directly into the turbocharger and directing a second portion of the flow of exhaust gases from all the combustion chambers in the exhaust gas recirculation passage loop.

5. A method comprising:
    expanding a first flow of exhaust gas from a set of combustion chambers of an engine in a turbine stage of a turbocharger;
    generating power from a generator connected to a shaft of the turbocharger;
    compressing a flow of air in a compressor stage of the turbocharger;
    directing a first portion of the compressed flow of air to an exhaust gas recirculation cooler and a second portion of the compressed flow of air to an intake manifold of the engine;
    cooling a second flow of exhaust gas from the set of combustion chambers of the engine in the exhaust gas recirculation cooler by drawing heat into the compressed flow of air;
    directing the second flow of exhaust gas from the set of combustion chambers back to the engine via the intake manifold in an exhaust gas recirculation passage loop;
    heating the compressed flow of air from the exhaust gas recirculation cooler using a combustor; and
    directing the heated compressed flow of air from exhaust gas recirculation cooler into the turbine stage of the turbocharger.

6. The method of claim 5, further comprising cooling the compressed flow of air using a charge air cooler.

7. A method comprising:
    expanding a first flow of exhaust gas from a first set of combustion chambers of an engine in a turbine stage of a turbocharger and compressing a flow of air in a compressor stage of the turbocharger;
    cooling the compressed flow of air using a charge air cooler;
    directing a first portion of the compressed flow of air to an exhaust gas recirculation cooler and a second portion of the compressed flow of air to an intake manifold of the engine;
    cooling a flow of exhaust gas from a second set of combustion chambers of the engine in the exhaust gas recirculation cooler by drawing heat into the compressed flow of air;
    directing the flow of exhaust gas from the second set of combustion chambers back to the engine via the intake manifold in an exhaust gas recirculation passage loop;
    directing the compressed flow of air from exhaust gas recirculation cooler into a power turbine for expansion and further into the turbine stage of the turbocharger; and
    directing the first flow of exhaust gas from the first set of combustion chambers of the engine in the turbine stage via a first exhaust manifold.

8. A system comprising:
    a first exhaust manifold in fluid communication with a plurality of combustion chambers of an internal combustion engine;
    a turbocharger comprising a turbine stage and a compressor stage, wherein the turbine stage comprises an inlet port in fluid communication with the first exhaust manifold and the compressor stage comprises an inlet port for air intake and an outlet port for compressed air;
    an exhaust gas recirculation cooler comprising a first flow path and a second flow path, wherein the first flow path is configured to receive a portion of exhaust gas from the first exhaust manifold flowing through an exhaust gas recirculation passage loop and the second flow path comprising an inlet for receiving a compressed air for drawing heat from the exhaust gas flowing through the first flow path;

a fluid communication between an outlet of the second flow path of the exhaust gas recirculation cooler and the inlet port of the turbine stage;

a charge air cooler in fluid communication with the outlet port of the compressor stage for cooling the compressed air and further providing the cooled compressed air to an intake manifold of the engine and the exhaust gas recirculation cooler; and a combustor disposed in fluid communication between the outlet of the second flow path of the exhaust gas recirculation cooler and the inlet port of the turbine stage.

9. The system of claim 8, wherein the exhaust gas recirculation passage loop comprises a flow of the exhaust gas from the first exhaust manifold or a second exhaust manifold via the exhaust gas recirculation cooler into the intake manifold and then into the internal combustion engine along with the cooled compressed air.

10. The system of claim 8, further comprising an electric generator coupled to a shaft of the turbine stage of the turbocharger.

11. The system of claim 8, further comprising a power turbine in fluid communication with the inlet port of the turbine stage of the turbocharger and a shaft of the power turbine that is coupled to an electric generator or a mechanical load.

12. The system of claim 8, further comprising a flow control valve located in fluid communication between the first exhaust manifold and the turbocharger to adjust the backpressure and the exhaust gas recirculation rate.

13. A system comprising:
a first exhaust manifold in fluid communication with a plurality of combustion chambers of an engine;
a turbocharger comprising a turbine stage and a compressor stage, wherein the turbine stage comprises an inlet port in fluid communication with the first exhaust manifold and the compressor stage comprises an inlet port for air intake and an outlet port for compressed air;
an exhaust gas recirculation cooler comprising a first flow path and a second flow path, wherein the first flow path is configured to receive a portion of exhaust gas from the first exhaust manifold flowing through an exhaust gas recirculation passage loop and the second flow path comprising an inlet for receiving a compressed air for drawing heat from the exhaust gas flowing through the first flow path;
a fluid communication between an outlet of the second flow path of the exhaust gas recirculation cooler and the inlet port of the turbine stage;
a charge air cooler in fluid communication with the outlet port of the compressor stage for cooling the compressed air and further providing the cooled compressed air to an intake manifold of the engine and the exhaust gas recirculation cooler; and
a power turbine in fluid communication with the inlet port of the turbine stage of the turbocharger and a shaft of the power turbine that is coupled to an electric generator or a mechanical load.

14. A system comprising:
a first exhaust manifold in fluid communication with a first set of combustion chambers of an engine;
a second exhaust manifold in fluid communication with a second set of combustion chambers of the engine;
a turbocharger comprising at least one turbine stage and at least one compression stage, wherein the at least one turbine stage comprises an inlet port in fluid communication with the first exhaust manifold;
an exhaust gas recirculation cooler having a first flow path and a second flow path, wherein the first flow path is configured to receive exhaust gas from the second exhaust manifold flowing through an exhaust gas recirculation loop and the second flow path comprising an inlet for receiving a compressed air for drawing heat from the exhaust gas flowing through the first flow path;
a power turbine having an inlet port in fluid communication with an outlet of the second flow path for expanding the heated compressed air;
a combustor disposed in the fluid communication between the power turbine and the outlet of the second flow path for providing additional heat to the heated compressed air; and
a charge air cooler in fluid communication with an outlet of the compressor stage for cooling the compressed air and further providing the cooled compressed air to an intake manifold of the engine and the exhaust gas recirculation cooler.

15. The system of claim 14, wherein the power turbine drives one of a mechanical load and an electric generator.

16. The system of claim 14, wherein the power turbine is a single stage axial or a single stage radial power turbine.

17. The system of claim 14, wherein the inlet port of the at least one turbine stage of the turbocharger is in fluid communication with an outlet port of the power turbine and the exhaust manifold.

18. The system of claim 14, wherein the combustor is an auxiliary combustor for providing the additional heat required for ensuring the heated compressed air to have temperatures equal to or greater than temperature of the exhaust gas at an engine upstream of the turbocharger.

19. The system of claim 14, further comprising a plurality of flow control valves for controlling one of flow of the exhaust gas in the exhaust gas recirculation loop, fuel flow rate to the combustor, and flow rate of the compressed air.

* * * * *